United States Patent Office 3,157,785
Patented Nov. 17, 1964

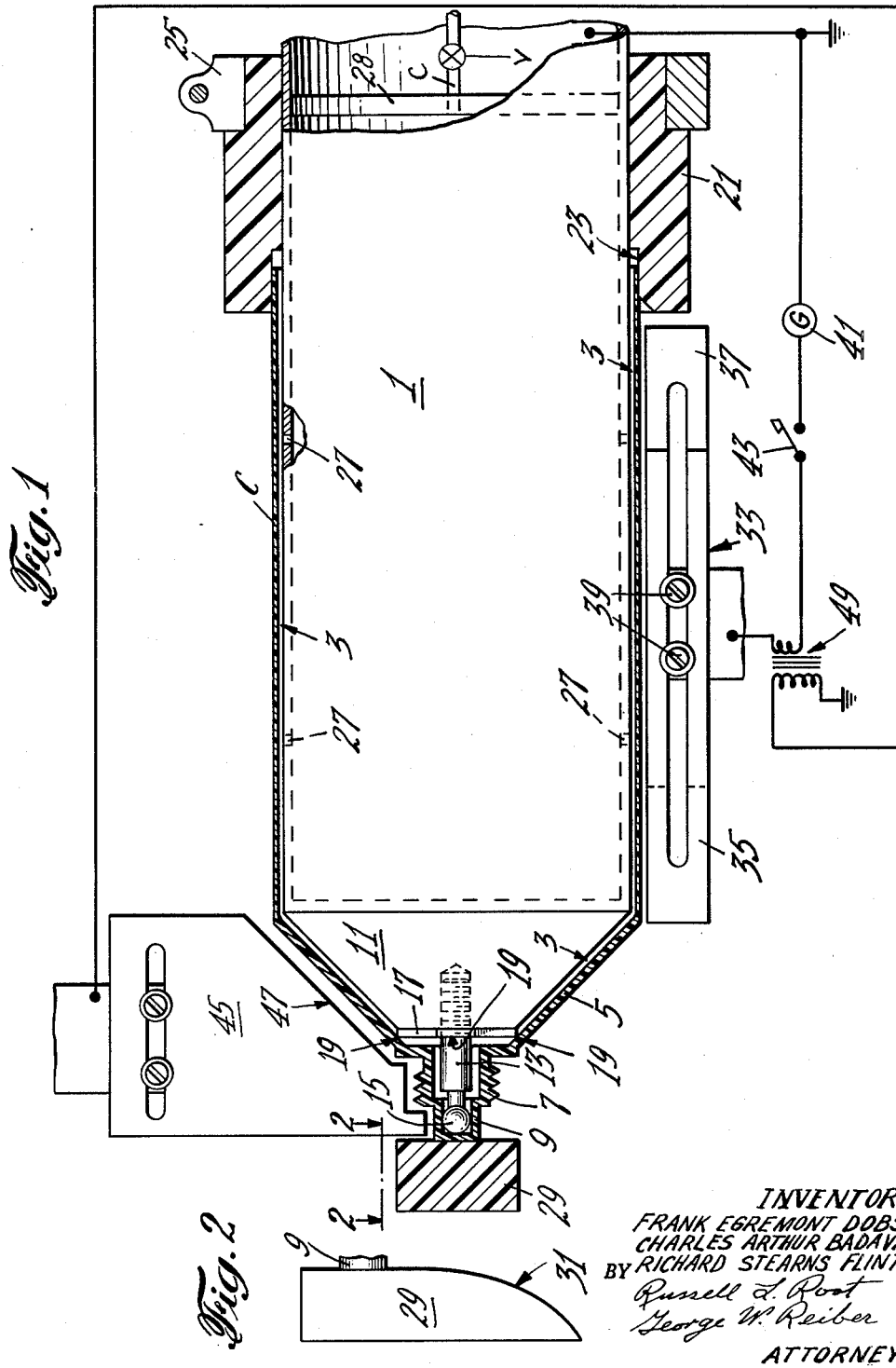

3,157,785
CORONA TREATING OF HOLLOW PLASTIC ARTICLES
Frank Egremont Dobson, Groton, Charles Arthur Badavas, Newton Highlands, and Richard Stearns Flint, South Acton, Mass., assignors to American Can Company, New York, N.Y., a corporation of New Jersey
Filed Mar. 30, 1961, Ser. No. 99,548
8 Claims. (Cl. 250—49.5)

This invention relates to the surface treatment of hollow plastic articles to provide thereon a surface receptive to inks, coatings, adhesives and the like and especially to the interior treatment of hollow containers to insure that interior coatings will adhere reliably and uniformly thereto.

Certain plastic materials, for example polyolefins such as polyethylene, have properties that normally make it difficult to secure good adhesion of coating materials to their surfaces. Various treatments have been developed for modifying the surface to improve the adhesion properties, including in particular the treatment of the surface of corona discharge. The surface of the plastic material to be treated must be held quite close to but still spaced from the treating electrode, for any portions which are in actual contact with the electrode will fail to receive treatment. The uniformity of the spacing also has some bearing upon the uniformity of the treatment achieved. The difficulties of securing fairly uniform spacing and avoiding excessive areas of contact are well known, and various ways have been developed to approach rather closely to the desired condition.

The present invention has for its object to provide an improved method and apparatus for securing such uniform spacing in a simple and accurate manner.

According to the present invention a combined mandrel and electrode substantially fitting the interior surface of the container to be treated but having slightly undersize dimensions is placed within the container. The open end of the container is closed by a collar which has a friction fit with the container exterior adjacent its open end. A fluid, for example air, is then introduced into the container preferably through perforations in the mandrel and this air pressure is utilized to maintain a uniform spacing between the outer surface of the mandrel and the inner surface of the container. Thus, when a corona discharge is applied to the surface of the container by any of the previously known arrangements, the treatment of the container interiors will be reliable and uniform. Moreover, the container is held on the mandrel in such a way as to be capable of ready placement and easy doffing to permit of convenient mechanization of the process.

Numerous other objects, features, and advantages of the invention will be apparent as it is better understood from the following description, which, taken in connection with the accompanying drawings, discloses a preferred embodiment thereof.

In the drawing:

FIG. 1 is an elevation partly in section of corona treating equipment according to the present invention, with the electrical circuit diagrammatically illustrated;

FIG. 2 is a fragmentary detail plan taken substantially on line 2—2 of FIG. 1.

Referring to the drawing, numeral 1 indicates a hollow metallic mandrel mounted on a suitable support (not shown). It will be understood, however, that if desired the mandrel 1 may be mounted on an indexing mechanism or turret as illustrated in U.S. Patent #3,102,193, which issued on August 27, 1963, to William Leonard Dobens, and that the mandrel 1 also may be rotatable on its support as shown in said application. As can be seen from the drawing, the mandrel is so designed as to fit loosely within the container C which is to be treated thereon so as to present a slight gap 3 between itself and the container. In the particular instance illustrated, the container has a conical breast portion 5, a threaded neck 7 and a closed tip or carotte 9. The mandrel 1 is correspondingly formed with a conical end section 11 fitting closely within the breast 5 and an axial projection 13 extending into the neck portion 7 and including preferably a spherical tip 15 which fits the interior of the carotte 9 and which serves to support and center the container at this point. Also as shown in the drawing, the mandrel 1 may include a support element 17 shaped to touch the inner container surface at a few isolated points such as 19 to provide additional support and centering action.

Mounted on the exterior of the mandrel 1 is an insulating collar 21 which has a recess or countersink 23 on that surface which faces toward the free end of the mandrel. The countersink 23 is of a size to receive the exterior surface of the container C with a snug friction fit. Preferably the collar 21 is of heat resistant plastic material such as polytetrafluoroethylene and is made adjustable along the mandrel 1 so as to accommodate containers of various lengths. The collar 21 is somewhat compressible and resilient and accordingly can be clamped in place against the surface of the mandrel 1 by a suitable clamping ring 25.

As previously stated, the mandrel 1 is hollow, and one or more small perforations 27 connect the interior and exterior thereof. Any conventional source of fluid pressure may be used to supply the interior of the mandrel 1. A typical arrangement is illustrated schematically in FIGURE 1 and comprises a conduit C which leads from a suitable source (not shown) into the end of the mandrel through a port in a closure plate 28. A valve V in the conduit regulates the fluid flow and the pressure within the mandrel and may be arranged to operate automatically, by appropriate mechanical, electrical or other conventional means (not shown) in proper sequence in the cycle of operation of the apparatus. The pressures employed are usually quite low, and pressures of approximately ½ p.s.i. have been found to give satisfactory performance in many cases. This pressure tends to separate the container C from the surface of the mandrel 1 and hence to keep the gap 3 essentially uniform and prevent local points of contact which might result from slightly flatened or otherwise out-of-shape tubes.

In order to insure that the container will remain on the mandrel 1, a barrier element 29 is positioned opposite the end of the mandrel so as to block any tendency of the container to be loosened or moved by the air pressure. When the device is employed in an automatic turret type arrangement, of course, the barrier element 29 is fixed opposite the station where the mandrels will reside during the treating step, and embodies an approach section or ramp 31 (Fig. 2) by means of which the barrier 29 and a container C on the mandrel 1 may be guided smoothly into coacting relationship as the turret rotates and carries the mandrel into the treating station.

The preferred form of the invention employs a rotatable mandrel 1 which may be driven in any suitable manner, and in particular by the arrangement shown in said U.S. Patent #3,102,193. Spaced slightly from the surface of the side wall of the container C is a bar electrode 33, preferably comprising slidably adjustable segments 35 and 37 held in adjusted position by clamp screws 39.

In this way the electrode may be adjusted to accommodate containers of different lengths.

A source of high level alternating voltage, for example generator 41 is electrically connected via switch 43 to the bar 37 and to the mandrel 1 so as to impress its voltage across the gap between these parts and thereby generate a corona discharge for treating the surfaces of the container C.

Another separate electrode bar 45 is preferably mounted adjacent the breast and neck portions of the container C inasmuch as these are frequently thicker than the side wall portions and hence require slightly different treating conditions. As can be seen from the drawing, the bar 45 has a contoured edge 47 designed to approach closely the outline of the head and neck. The gap between the electrode 45 and the mandrel 1 also has impressed thereacross a suitable high level alternating voltage drop. Since the breast and neck of a container are usually of thicker material than the side wall, a somewhat higher impressed voltage is usually desirable. This is indicated generally by showing the mandrel 1 and bar 45 connected to the secondary of a step-up transformer 49 whose primary may be, if desired, served by generator 41.

In operation a plastic container C is slipped over the end of the mandrel 1 and its open end is forced into the countersink 23 of the collar 21. The collar 21 may, of course, be adjusted along the mandrel 1 to the proper location for the container about to be treated. The carotte 9 slidingly receives the spherical tip 15 and helps to center the container C generally on the mandrel. Points 19 of support element 17 also assist in this locating function. With the parts in this position, the mandrel will be moved laterally (for example by an indexing turret) until the end of carotte 9 rests against the barrier element 29. Then air pressure of the desired value is admitted to the interior of mandrel 1 and, via openings 27, to the space 3 between the mandrel and the container C. This air pressure distends the container C slightly to its true shape and maintains the desired spacing throughout the whole interior surface area. Thereafter switch 43 is closed and corona discharge is generated at bar 35 and bar 45 while mandrel 1 is rotated to bring the discharge into treating relation with each element of the container C in turn. Since the space 3 is uniformly and accurately maintained the treatment will take effect uniformly over the whole interior surface of the container. The exterior surface is, of course, also treated in the process herein shown and described.

After removal of the mandrel 1 from a position of alignment with barrier element 29 the container is doffed, the interior coated, and the carotte 9 usually cropped. It will also be noted that in the preferred arrangement treatment of the margin of the container at the open end is avoided to provide for more ready closing of the container by heat sealing to a plastic closure element or by a flat pinch seal of the side wall to itself.

It is thought that the invention and many of its attendant advantages will be understood from the foregoing description and it will be apparent that various changes may be made in the form, construction, and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

We claim:

1. A device for corona treating hollow open-end articles comprising a perforate conductive mandrel loosely fitting the interior of the articles to be treated, a collar surrounding the mandrel and having a recess for frictionally exteriorly receiving the open end of the article, means for introducing fluid under pressure through the mandrel perforation to space the article slightly from the mandrel surface, an electrode mounted adjacent the mandrel, and means for impressing a high level alternating voltage between said electrode and mandrel to generate a corona discharge at the article surfaces.

2. A device as set forth in claim 1 in which the collar is adjustable along the mandrel to accommodate articles of different lengths.

3. Apparatus for corona treating the inner surfaces of a tubular plastic article, comprising a perforate electrically conductive mandrel loosely fitting the interior of the article to be treated, means for introducing fluid under pressure through the mandrel perforation to space the inner surfaces of the article slightly from the exterior of the mandrel, an electrode mounted adjacent said mandrel, and means connected to said mandrel for impressing a high level alternating voltage across the space between said electrode and said mandrel to generate a corona discharge at the article surfaces.

4. Apparatus for corona treating the inner surfaces of a tubular plastic article, comprising a perforate electrically conductive mandrel loosely fitting the interior of the article to be treated, means for introducing fluid under pressure through the mandrel perforation to space the inner surfaces of the article slightly from the exterior of the mandrel, means restraining said tubular article against movement on said mandrel, an electrode mounted adjacent said mandrel, and means connected to said mandrel for impressing a high level alternating voltage across the space between said electrode and said mandrel to generate a corona discharge at the article surfaces.

5. Apparatus for corona treating a tubular plastic article, comprising a perforate electrically conductive mandrel loosely fitting the interior of the article to be treated, means for introducing fluid under pressure through the mandrel perforation to space the inner surfaces of the article slightly from the exterior of the mandrel, an electrode mounted adjacent the exterior of the mandrel, and means for impressing a high level alternating voltage between said electrode and mandrel to generate a corona discharge at the article surfaces.

6. Apparatus for corona treating the inner surfaces of a tubular plastic article, comprising an electrically conductive mandrel loosely fitting the interior of the article to be treated, means for introducing fluid between said article and said mandrel to provide a uniform space therebetween, an electrode mounted adjacent said mandrel, and means connected to said mandrel for impressing a high level alternating voltage across the space between said electrode and said mandrel to generate a corona discharge at the article surfaces.

7. A device as set forth in claim 6 which includes barrier means positioned to block movement of the article off the mandrel under the influence of the fluid pressure.

8. A device as set forth in claim 7 in which the barrier element includes an approach ramp for guiding the barrier and an article on the mandrel into coacting relationship.

No references cited.